United States Patent [19]
Corlett et al.

[11] Patent Number: 5,832,060
[45] Date of Patent: Nov. 3, 1998

[54] SYSTEM AND ASSOCIATED METHOD FOR CONCATENATED MESSAGING

[75] Inventors: Renata N.A. Corlett, Louisville; Karen Siegel-Jacobs, Boulder; George J. Boggs, Nederland, all of Colo.; Lorraine M. Vienneau, Phoenix, Ariz.

[73] Assignees: U S West, Inc., Denver; MediaOne Group, Inc., Englewood, both of Colo.

[21] Appl. No.: 665,137

[22] Filed: Jun. 14, 1996

[51] Int. Cl.⁶ ...................................................... H04M 1/64
[52] U.S. Cl. ............................... 379/88; 379/70; 379/210
[58] Field of Search .................. 379/67, 88, 89, 379/69, 70, 210

[56] References Cited

U.S. PATENT DOCUMENTS

| | | | |
|---|---|---|---|
| 4,766,604 | 8/1988 | Axberg | 379/67 |
| 4,825,460 | 4/1989 | Carter et al. | 379/67 |
| 4,972,461 | 11/1990 | Brown et al. | 379/67 |
| 5,003,584 | 3/1991 | Benyacar et al. | 379/119 |
| 5,023,868 | 6/1991 | Davidson et al. | 379/89 |
| 5,099,509 | 3/1992 | Morganstein et al. | 379/84 |
| 5,134,646 | 7/1992 | Carlson | 379/67 |
| 5,311,574 | 5/1994 | Livanos | 379/88 |
| 5,333,186 | 7/1994 | Gupta | 379/201 |
| 5,455,852 | 10/1995 | Elrod et al. | 379/67 |
| 5,483,582 | 1/1996 | Pugh et al. | 379/144 |
| 5,504,805 | 4/1996 | Lee | 379/67 |

FOREIGN PATENT DOCUMENTS 157257  9/1983  Japan .

OTHER PUBLICATIONS

Digital Sound Corporation "Voiceserver Automated Attendant" Advertisement, Nov., 1988.

*Primary Examiner*—Fan S. Tsang
*Attorney, Agent, or Firm*—Holme, Roberts & Owen, LLP

[57] ABSTRACT

A method for call back messaging is disclosed. The method allows a calling party to provide name and number information for automatic delivery to a called party in instances where the called party does not answer the incoming call, or where the line of the called party is busy. The method of the present invention may include the steps of processing an exception for an incoming call from the calling party to the called party, playing at least a first announcement to the calling party to provide the calling party an opportunity to provide information to the called party, processing information provided by the calling party, placing at least a first call to the called party to attempt to deliver the information provided by the calling party and playing at least a first message to the called party, the first messaging containing the information provided by the calling party.

19 Claims, 9 Drawing Sheets

SYSTEM AND ASSOCIATED METHOD FOR CONCATENATED MESSAGING

FIELD OF THE INVENTION

The present invention relates to a method and system for facilitating communication between a calling party and a called party via the telephone number of the called party, and in particular, to a method and system for delivering a message from a calling party to the called party.

BACKGROUND OF THE INVENTION

In order to communicate with a selected individual via a telephone, a calling party may generally attempt to communicate with the individual (e.g., called party) by placing a telephone call to a specific termination telephone number associated with the individual. However, in some instances, where a busy signal is received, or there is no answer, communication may not be readily established between a calling party and a called party.

One approach for facilitating communication between parties where a busy signal is received or where there is no answer concerns voice mail or message systems. In such situations, voice message systems invite the calling party to leave a message for the party being telephoned. Such voice message systems allow each calling party to leave a detailed message. In fact, such voice message systems typically allow each calling party to leave a message having a length of up to three minutes. In order to listen to the messages left by calling parties on such voice message systems, the called party must typically place a telephone call to a specific termination telephone number associated with the voice message system and retrieve the messages by dialing in a personal identification code.

SUMMARY OF THE INVENTION

Accordingly, it is a primary object of the present invention to facilitate communication between a calling party and a called party.

It is another object of the present invention to provide a calling party an efficient and cost effective system and method for communicating with a called party via a termination telephone number associated with the called party, especially where the called party is on the line or does not answer.

It is a further object of the present invention provide a called party a convenient and user-friendly system and method for listening to messages from calling parties.

The present invention achieves one or more objectives by providing a system and associated method for call back messaging. The present invention contemplates providing a method for facilitating communication between a calling party and a called party via a termination telephone number associated with the called party. In one embodiment, the method includes the steps of processing an exception (e.g., busy signal, no-answer condition) associated with an incoming call from the calling party to the termination telephone number of the called party, playing at least a first announcement to the calling party to provide the calling party an opportunity to provide information to the called party, receiving information provided by the calling party for the called party, placing a call to the called party via the termination telephone number of the called party to attempt to deliver the information provided by the calling party to the called party, and playing at least a first message, which includes the information provided by the calling party, to the called party upon completion of the call. The information from the calling party may be received in the form of voice inputs and/or dual tone multiple frequency ("DTMF") inputs. Further, such voice inputs and/or DTMF inputs may be indicative of the identity and/or a termination telephone number of the calling party. In this regard, upon placement and completion of a call to the called party and playing of the first message to the called party, the called party may be informed as to the identity and/or telephone number of any party who called when the called party's line was busy, or when the called party did not answer the phone. As such, the method of the present invention provides a cost effective and efficient way for a calling party to provide a concise, concatenated message containing relevant information (e.g., identity and telephone number for return call to calling party) to a called party. Furthermore, as the method of the present invention contemplates delivering the information provided by the calling party by automatically placing a call to the called party and, upon completion of the call, playing to the called party a message containing the calling party information, the invention allows a called party to automatically receive such information from a calling party simply by answering a telephone call. In another embodiment, the method includes the steps of processing an exception, such as a busy signal or no-answer condition, associated with an incoming call from the calling party to the termination telephone number of the called party, collecting information from the calling party, such as the termination telephone number from which the incoming call from the calling party originated (e.g., via a switch which received and has a record of the incoming call), and placing at least a first telephone call to the called party to attempt to deliver to the called party, via playing a first message, at least the termination telephone number of the calling party.

In one aspect of the invention, upon detection of an exception, such as a busy signal or a no-answer condition, the method of the present invention contemplates playing at least a first announcement to the calling party. The first announcement may indicate to the calling party that the called party's line is busy, or alternatively, that there is no answer. To facilitate communication with the called party, the first announcement may solicit the calling party, at the calling party's option, to provide relevant information to the called party, information which will be delivered at a later time to the called party. In one embodiment, the method involves receiving at least first indication or input from the calling party in response to the first announcement. In such instances, the first indication may be indicative of an election or decision by the calling party to provide relevant information to the called party. Receiving the first indication may concern recognizing a voice response (e.g., spoken words) and/or decoding a DTMF input from the calling party.

In another aspect, the method of the present invention may include the step of playing a second announcement to the calling party to solicit relevant information from the calling party. In this regard, the second announcement may include a first prompt for information concerning the identity of the calling party (e.g., name) and a second prompt for a termination telephone number associated with the calling party. Such information from the calling party may be in the form of voice inputs (e.g., spoken words) and/or DTMF inputs, which may be collected for delivery at a later time to the called party. Alternatively, in another embodiment, instead of playing both of the above-noted first and second announcements to the calling party, the first announcement may simply invite the calling party to provide relevant information (e.g., name and/or telephone number) for delivery to the called party.

For purposes of providing a cost effective and efficient way for calling parties to leave only relevant information for automatic delivery to the called party, the method may include the step of defining at least a first time period for receiving information from the calling party. More specifically, in one embodiment, the method includes defining first and second time periods for collecting voice and/or DTMF inputs from the calling party indicative of the identity and a termination telephone number associated with the calling party. In this regard, the method contemplates receiving information from the calling party within a predetermined window of time, such that only requested information is collected from the calling party. In one embodiment, each of the time periods for collecting (e.g., recording) the identity and termination telephone number of the calling party are less than or equal to about 6 seconds. In instances where the identity of the calling party is to be collected in one of the first and second time periods via a voice input from the calling party, the time period for collecting the identity is less than or equal to about 3 seconds.

As noted hereinabove, for purposes of attempting to deliver to the called party the information provided by the calling party, the method of the present invention contemplates using the termination telephone number of the called party to place at least a first telephone call to the called party. Such a first telephone call may be placed after the information is provided by the calling party. In this regard, the method of the present invention may also include the step of scheduling at least one telephone call to the called party to deliver the information provided by the calling party. For example, the first telephone call and any subsequent calls to the called party may be scheduled every hour until the information is delivered to the called party. In this regard, scheduling such time for placement of telephone calls to deliver the information may include the step of defining a time interval for placing consecutive telephone calls to the called party such that placement of such telephone calls is periodic (e.g., every 30 or 60 minutes until one of the telephone calls is answered and the message from the calling party is played/delivered to the called party). In some instances, the first telephone call will be answered by the called party (e.g., successfully completed), at which time a message may be played to the called party to deliver the information from the calling party. However, in other instances, a busy signal or no-answer condition may be detected on the first telephone call when attempting to deliver to the called party the information provided by the calling party. For purposes of attempting to ensure delivery of the information to the called party after placement of the first call, where a busy signal or no-answer condition was detected, the method of the present invention also contemplates placing at least a second telephone call to the called party. The second telephone call to the called party may be initiated an interval of time after the first telephone call to the called party, according to the schedule defined in the scheduling step. In an alternative embodiment, in instances where a busy signal was detected, the method of the present invention includes the step of monitoring the called party's telephone line for an on-hook condition, which would indicate that the called party's line is no longer busy. When such an on-hook condition is detected, a telephone call may be placed to the called party via the termination telephone number of the called party to attempt to deliver the information provided by the calling party.

In another embodiment, the method of the present invention may also include the step of queuing information provided by the calling party for delivery to the called party. This is especially useful where a number of calling parties attempt to communicate with the called party via the termination telephone number of the called party and the information from a previous calling party has yet not been delivered to the called party (e.g., the called party's line is still busy or no answer is received for an extended period of time). For example, where a first calling party has provided information and such information has not yet been delivered to the called party, a subsequent, second calling party's information may be queued behind the prior calling party's information, such that the information from the first and second calling parties will be delivered (e.g., played) to the called party in the order in which such information was received. Alternatively, for purposes of affording calling parties an opportunity to have their information delivered to the called party in a priority fashion, the method may also provide the calling parties an option to mark their information (e.g., urgent) such that the information of a particular calling party may be queued ahead of previous calling parties and attempts to deliver the information may be made more frequently.

In still another embodiment, for purposes of facilitating communication between the calling and called parties, once a message from the calling party is delivered to the called party, the method of the present invention also contemplates providing an option to the called party to be connected to the calling party via the termination telephone number provided by the calling party. More specifically, a second message including an option to be connected to the calling party may be played to the called party to provide the called party an opportunity to efficiently communicate with the calling party. In this regard, the method may concern prompting the called party in a second message containing an option to be connected to the calling party who previously called the called party. The method may also include the steps of receiving an input (e.g., voice or DTMF input) indicative of an election by the called party to be connected to the calling party and processing the input from the called party to initiate placing a telephone call to the calling party via the termination telephone number of the calling party. If appropriate, matching of the calling party's input and the last call record on the switch would occur to ensure the called party is connected to the desired calling party.

In another aspect of the invention, the present invention contemplates providing a system for facilitating communication between a calling party and a called party via a termination telephone number associated with the called party. Generally, the system includes a switch for processing an incoming call from the calling party to the called party to determine whether the incoming call was completed to the called party and a peripheral for collecting, storing and delivering to the called party information from the calling party. In one embodiment, the system includes a detector for noting an exception associated with an incoming call by the calling party to the termination telephone number of the called party, a first player for playing at least a first announcement to the calling party to provide an option to the calling party to provide information to be delivered from the calling party to the called party, a processor for processing an indication by the calling party of an election by the calling party to provide information for delivery to the called party, a second player for playing a second announcement to the calling party to solicit the information from the calling party and for playing a first message to the called party, wherein the first message includes the information provided by the calling party, a receiver for collecting information from the calling party, and a calling unit for placing a telephone call to the called party via the termination telephone number of the called party to attempt to deliver the information via the second player. In another embodiment, the functions of the first and second players are conducted by a single system, and may be implemented in either the switch or the peripheral. In yet another embodiment, the functions of the second player are conducted by two separate playing devices, which may be implemented in the peripheral or, alternatively, in the switch.

In particular, for purposes of collecting and processing inputs from the calling party such that at least part of the information may be provided to the called party in the form of a verbalized message, the peripheral may include a receiver capable of recording the voice of the calling party. For purposes of determining a termination telephone number of the calling party, the receiver may include a voice recognition unit or a DTMF decoder, wherein the output of the voice recognition unit or DTMF decoder is convertible into or communicatable to the called party as a verbalized message. In this regard, a calling party may state or dial-in (e.g., punch-in) the termination telephone number of the calling party for receipt and processing by the receiver. In an alternative embodiment, the receiver is implemented in the switch.

In one embodiment, for purposes of attempting to deliver to the called party the concatenated information provided by the calling party, the peripheral, and specifically, the calling unit of the present invention is capable of instructing the switch to outdial the termination telephone number of the called party. In this regard, the peripheral responsible for receiving the information from the calling party may process the information and data and place a telephone call to the termination telephone number of the called party via the switch. In instances where the call to the called party is completed, the peripheral, and specifically, the second player, may be activated to play a voice message to the called party, wherein the message contains information concerning the called party. In an alternative embodiment, the switch includes the device for outdialing the termination telephone number of the called party and the second player for playing back to the called party a message having information provided by the calling party.

In another embodiment, the system may also include a scheduler, which is especially useful in instances where, in attempting to deliver the information provided by the calling party, an exception, such as a busy signal or no-answer condition, is detected. In such instances, the system of the present invention may initiate a schedule for placing telephone calls to the called party at preselected times and/or intervals. In this regard, the system provides for attempting to deliver the information provided by a calling party at regular intervals until a call is completed, that is, answered by the called party such that the concatenated voice message may be played to the called party. In one embodiment, the scheduler is implemented in the peripheral. Alternatively, the scheduler is implemented in the switch.

In yet another embodiment, the system of the present invention further includes a queuer for queuing information provided by a plurality of (e.g., multiple) calling parties. Such a queuer is especially useful in instances where information provided by a prior calling party has not yet been delivered to the called party and a subsequent calling party also provides information to be delivered to the called party. In one embodiment, the queuer is capable of ordering the information to be delivered to the called party according to the sequence in which such information was received from the calling parties. In another embodiment, the queuer cooperates with the scheduler such that queued information provided by a plurality of calling parties is scheduled for attempted delivery to the called party according to the schedule designated for a first of the calling parties' information, assuming that the first of the calling parties' information has not yet been delivered to the called party. The queuer may be implemented in either the peripheral or the switch.

In yet another embodiment, the system may further include a system for defining a time period during which the receiver will collect information, such that the collection of information from the calling party is limited to the period of time specified or predetermined. In this regard, the system may quickly and efficiently collect and send from the calling party a concatenated voice message (e.g., identity and call back number of the calling party) for delivery to the called party. In one embodiment, less than or about 3 seconds is provided for collecting certain information, such as the name via voice inputs, from the calling party. Such a system for defining a time period may be implemented in either the peripheral or the switch.

DETAILED DESCRIPTION

The call back messaging system of the present invention is generally used to facilitate communication between a calling party and a called party. In particular, the call back messaging system is especially useful in instances where the calling party places an incoming call to the called party via a termination telephone number associated with the called party and cannot immediately speak with the called party (e.g., the calling party receives a busy signal or no-answer).

Figure 1:
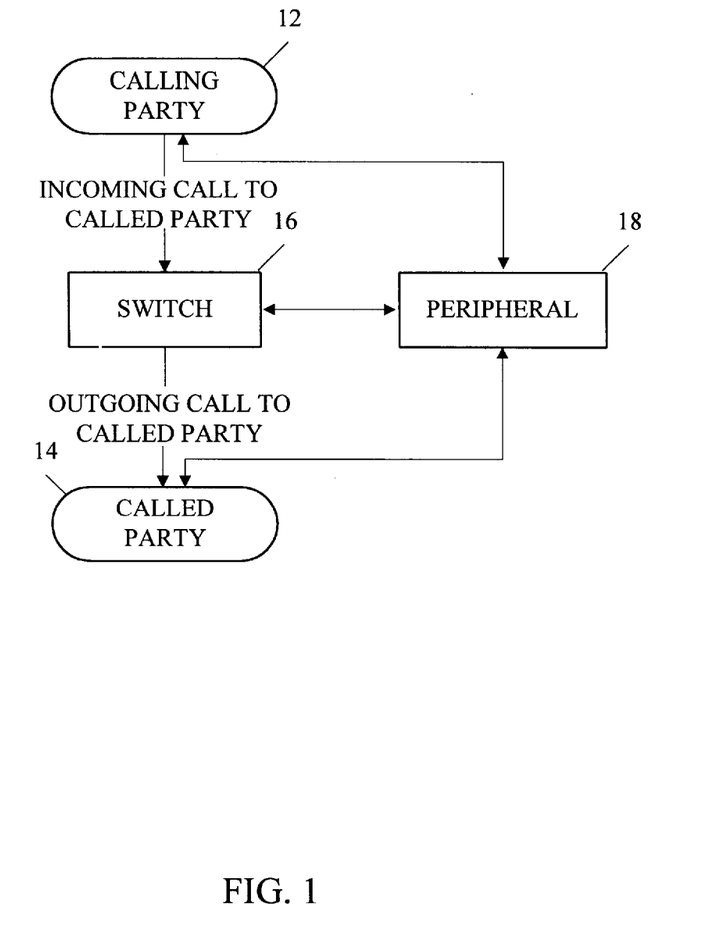
FIG. 1 is a diagrammatic illustration showing one embodiment of the call back messaging system according to the present invention.

FIG. 1 is a block diagram of one embodiment of the invention which generally illustrates the call back messaging system 10 of the present invention. In particular, the call back messaging system 10 of the present invention facilitates communication between a calling party 12 and a called party 14 by using a central office switch 16 (e.g., Nortel's DMS-100 Supernode NA004 Switch, AT&T's 5ESS or 1AESS switch, an AIN capable switch etc.) and possibly a peripheral 18. In this regard, and as will be described in more detail hereinbelow, the switch 16 and peripheral 18 cooperate to detect an exception associated with the termination telephone number of the called party 14, play at least a first announcement to the calling party 12 to solicit information from the calling party 12, receive information (e.g., identity and termination telephone number of calling party 12) from the calling party 12, automatically initiate and place a call to the called party 14 to attempt to deliver the information provided by the calling party 12 and play at least a first message to the called party 14 to deliver the information provided by the calling party 12.

FIGS. 2A–2B and 3A–3B illustrate block diagrams of embodiments of the call back messaging system 10 of the present invention. FIGS. 4A–4B and 5A–5B illustrate generally corresponding flow charts for methods for facilitating communication between the calling party 12 and the called party 14. For purposes of facilitating communication between the calling party 12 and the called party 14 in instances where the detector 20 registers a busy signal or a no-answer condition on the termination telephone number associated with the called party 14, the system 10 is capable of receiving from the calling party 12 and automatically delivering to the called party 14 information from the calling party (e.g., identity of calling party 12 and/or termination telephone number associated with the calling party 12). In particular, in the embodiment illustrated in FIGS. 2A–2B, the system 10 generally includes a detector 20 for noting whether an incoming call from a calling party 12 is completed to the called party 14 or has encountered an exception, such as a busy signal or no-answer condition, a first player 30 for playing at least a first announcement to the calling party 12 to solicit at least some information from the calling party 12, a processor 40 for processing an indication by the calling party 12 in response to the first announcement, a second player 50 for soliciting information from the calling party 12 for delivery to the called party 14 and for playing a first message to the called party 14, the first message including the information provided by the calling party 12 and a first receiver 60 for collecting, processing and storing information provided by the calling party 12. Of importance, the system 10 also includes a caller 70 for automatically placing or initiating at least a first telephone call to the called party 14 to attempt to deliver the information provided by the calling party 12. The system 10 is convenient for the calling party 12 as the system 10 allows the calling party 12 to leave a short, concise and concatenated message for the called party 14 in situations where the called party's 14 line is busy or no answer is received. Moreover, the system 10 is convenient and cost effective for the called party 14 as the system 10 is capable of automatically placing at least a first call to the called party 14 to attempt to deliver the information provided by the calling party 12. In this regard, the called party 14 must simply answer the telephone to receive messages from calling parties.

Figure 4A:
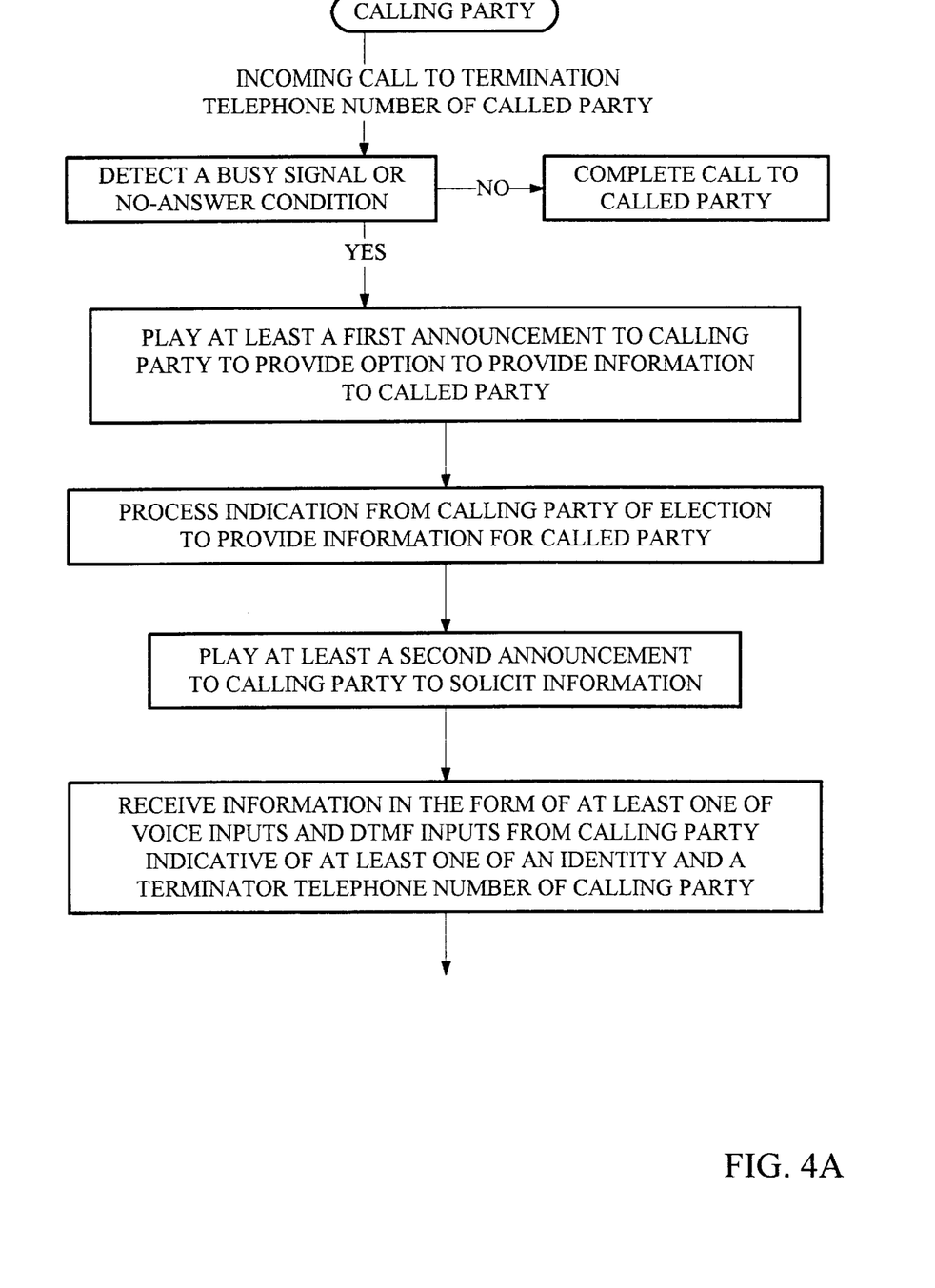
FIGS. 4A–4B present a flow chart of the call back messaging process according to one embodiment of the present invention.
Figure 4B:
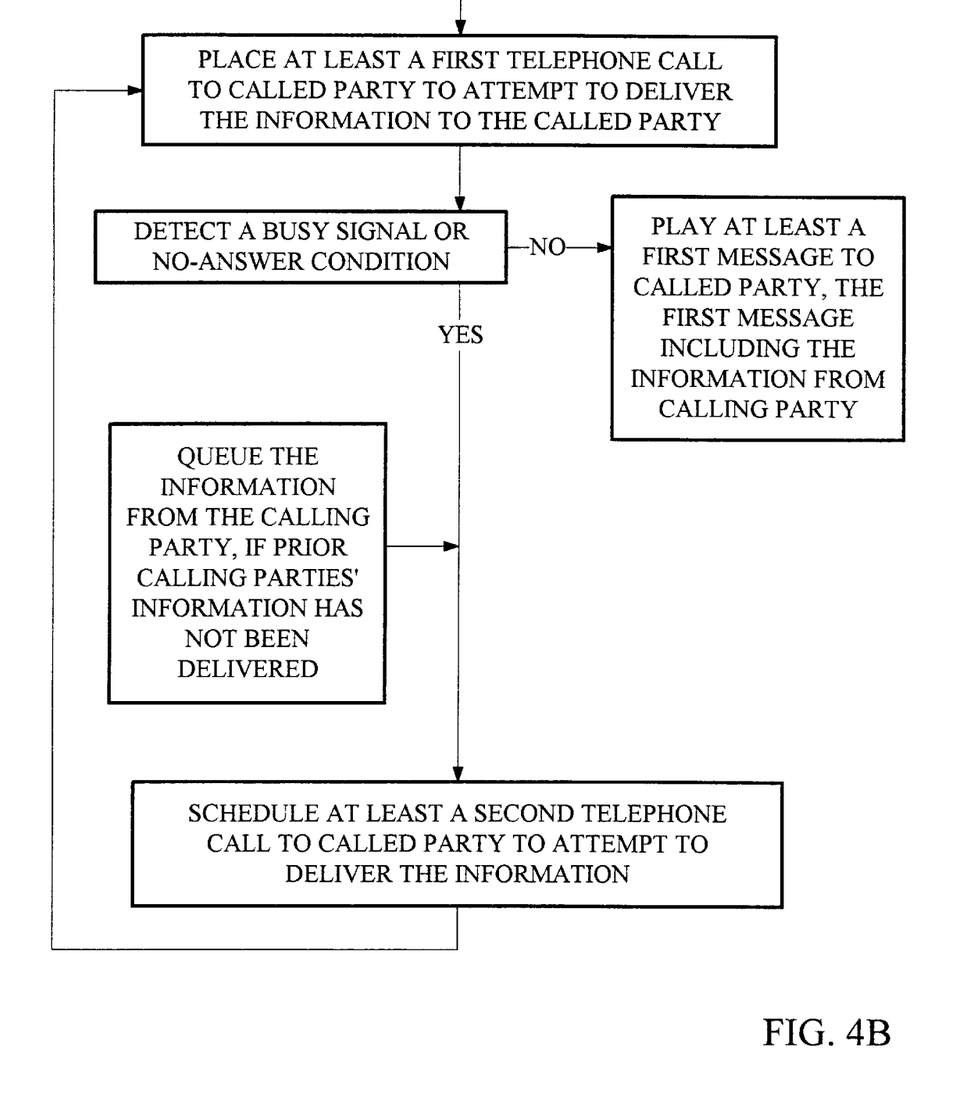

In one embodiment, illustrated in FIGS. 4A–4B, the method of the present invention includes the step of detecting whether the incoming call from a calling party is answered or whether an exception condition associated with the termination telephone number of the called party is noted. More specifically, and referring to FIGS. 2A–2B, an incoming call from the calling party 12 to the called party 14 is received by the switch 16, and specifically, the detector 20, which detects whether an exception condition is associated with the incoming call to the called party 14. In one embodiment, the detector 20 is capable of noting or detecting whether the incoming call from the calling party 12 to the called party 14 has been completed or not. The detector 20 is thus capable of noting an exception condition (e.g., busy signal, no-answer) to completion of the incoming call from the calling party 12 to the called party 14. For purposes of facilitating detection of exceptions associated with an incoming call, the detector 20 is implemented into the central office switch 16, such as a DMS-100 switch, which is commercially available from Nortel. In one embodiment, the detector 20 is implemented in a DMS-100 switch as Nortel's Special Delivery Service ("SDS").

Figure 2A:
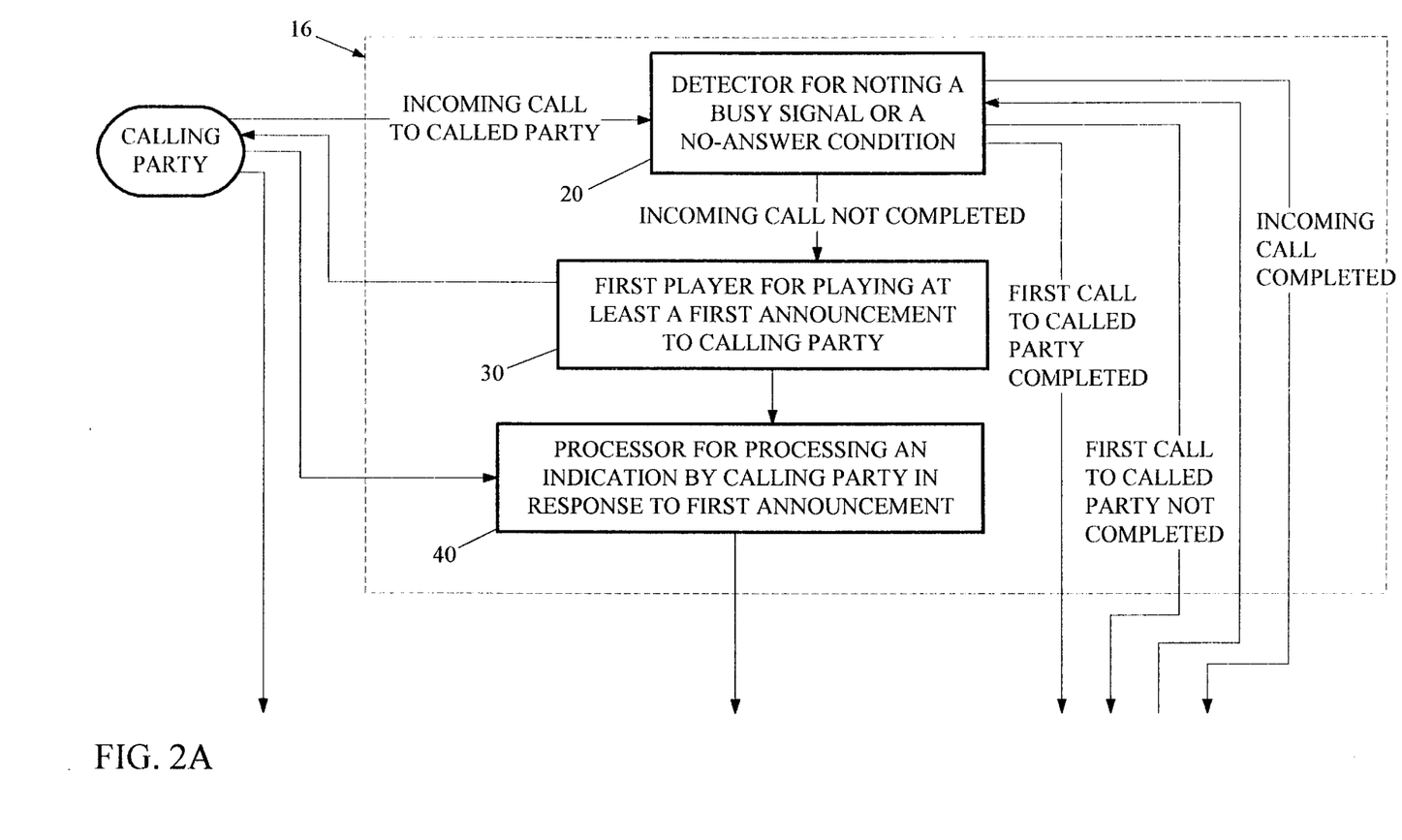
FIGS. 2A–2B present a diagrammatic illustration showing another embodiment of the call back messaging system according to the present invention.
Figure 2B:
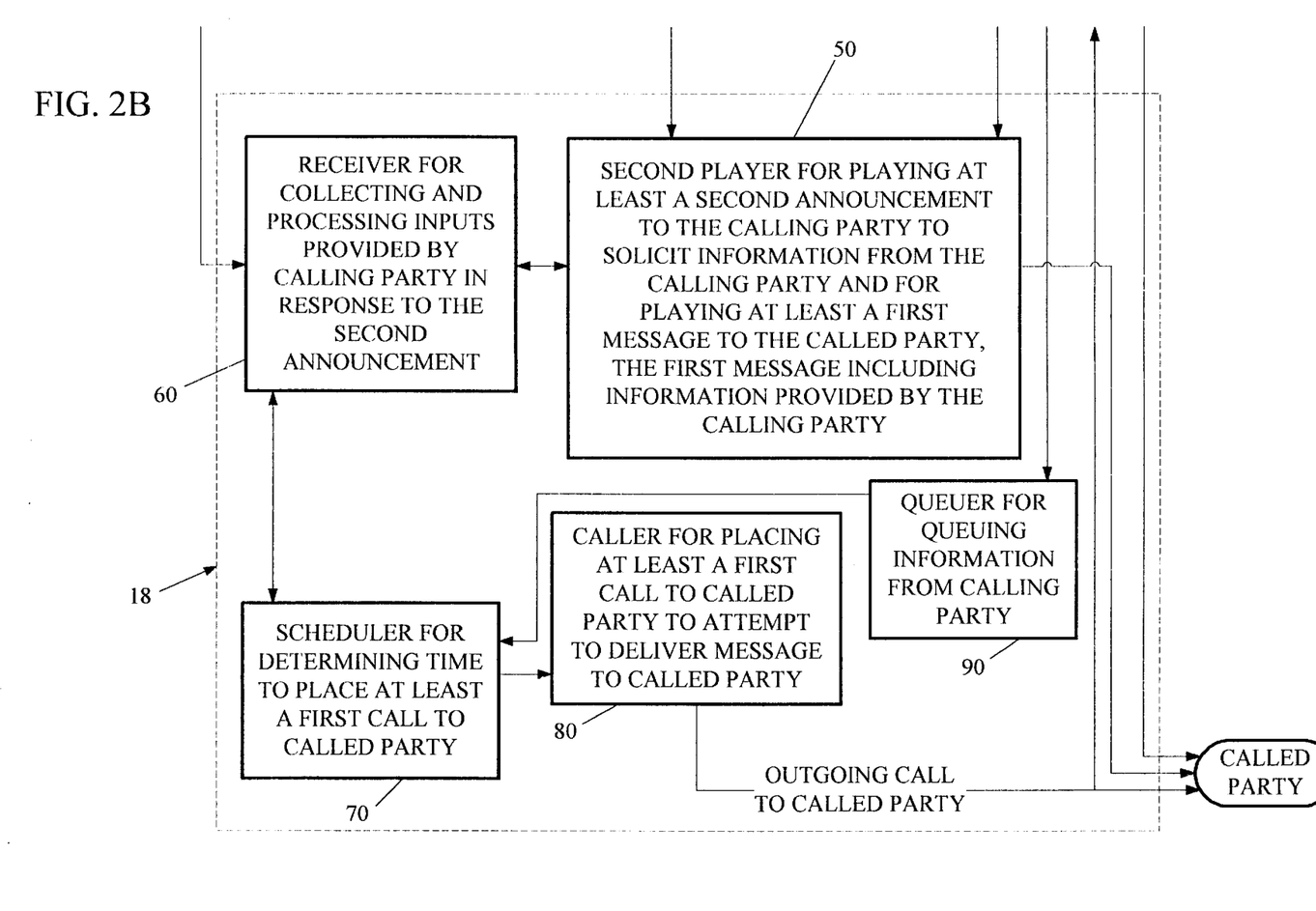

In instances where the above-described detector 20 notes a busy signal or a no-answer condition associated with the incoming call from the calling party 12 to the called party 14, the first player 30 is activated to play at least a first announcement to the calling party 14, as shown in FIGS. 2A–2B. In this regard, the method of the present invention further includes the step of playing at least a first announcement to the calling party 14, as shown in FIGS. 4A–4B. In one embodiment, the first announcement generally informs the calling party 12 that, in relation to the calling party's 12 incoming call to the called party 14, a busy signal or no-answer condition was noted. The first announcement also provides the calling party 12 an option or opportunity to leave a short, concise message for delivery to the called party 14. In this regard, the first announcement prompts the calling party 12 for an indication (e.g., DTMF inputs, voice inputs) that the calling party 12 wishes to utilize the service to provide information to the called party 14. Where the calling party 12 will be billed for the cost associated with leaving such a short, concise message for delivery to the called party 14, the first announcement may also inform the calling party 12 that the cost for providing and delivering such information to the called party 14 will be billed to the calling party 12.

In one embodiment, the first announcement includes a recording playable to the calling party 12, such as, "the phone number you are calling is busy. This service will request a call back by delivering your name and number on a scheduled basis for a 24 hour period. To send your name and number, for XX cents, press 1 on your touch tone telephone or state the number 1. Otherwise, hang up." In another embodiment, for use in instances where the detector 20 detects a no-answer condition (e.g., after 5 rings), the first announcement includes a recording playable to the calling party 12, such as, "the person you are calling is not answering. This service will request a call back by delivering your name and number on a scheduled basis for a 24 hour period. To send your name and number, for XX cents, press 1 or state the number 1 or press 2 to keep ringing. Otherwise, hang up." These embodiments of the first announcement are especially useful in instances where touch tone telephones are not available as calling parties may simply verbalize their indication to provide information to the called party 14. Alternatively, the first announcement may simply inform the calling party that the person being called is not answering or the phone number being called is busy, and that if the calling party wishes to request a call back by having the name and phone number delivered to the called party, for XX cents, please stay on the line, or hang up. In this embodiment, the calling party's indication of an election to provide information to the called party is manifested by staying on the line.

Generally, the first player 30 is capable of storing and playing at least the first announcement. In this regard, the first player 30 stores a recording of the first announcement on tape or, alternatively, the first player 30 digitally stores the first announcement. In one embodiment, the first player 30 for playing the first announcement is interconnected to the detector 20, within the switch 16, such as a DMS-100 switch. In this regard, the first player 30 is embodied in a switch 16. As such, the first announcement is digitally stored in a voice card, such as Nortel's commercially available EDRAMS voice card. In another embodiment, the first player 30 is implemented in a voice card or board (e.g., commercially available from Dialogic) associated with a peripheral 18 (e.g., Octel's commercially available Voice Messaging peripheral, AT&T's commercially available Voice Messaging unit). In yet another embodiment, the first player 30 is implemented in any other combination of hardware, software and firmware.

As noted hereinabove, in response to the first announcement from the first player 30, for purposes of electing to provide information to be delivered to the called party 14, the calling party 12 may provide inputs in the form of one or more voice inputs (e.g., spoken word(s)) or one or more DTMF inputs from a touch tone telephone. In order to process such inputs indicative of an election by the calling party 12 to provide information for the called party 14, in one embodiment, the switch 16 includes a processor 40, which performs the steps of receiving and processing such inputs from the calling party 12. As such, the processor 40 is capable of decoding DTMF inputs and/or performing recognition on voice inputs from the calling party 12. In one embodiment, the processor 40 is implemented in the switch 16 and is embodied in Nortel's SDS.

In order to at least obtain relevant information from the calling party 12 for delivery to the called party 14, the method of the present invention, shown in FIGS. 4A–4B, contemplates playing a second announcement to the calling party to obtain relevant information from the calling party to facilitate a call back from the called party. In one embodiment, illustrated in FIGS. 2A–2B, the system 10 includes a second player 50 which is capable of playing at least a second announcement to solicit particular information from the calling party 12. In one embodiment, the second announcement includes a first prompt for the identity or name of the calling party 12 and a second prompt for a termination telephone number associated with the calling party 12. The first and second prompts may be played to the calling party 12 with an interval of time therebetween to provide the calling party 12 an opportunity to provide an input in response to the first prompt prior to playing of the second prompt by the second player 50. In this regard, in one embodiment, the first prompt includes "at the tone, please say your name" while the second prompt includes "please enter your telephone number". Alternatively, the first and second prompts may be played consecutively, without a time interval therebetween.

In another embodiment, the second announcement may include, in addition to the above-described first and second prompts, first and second confirmation statements to be played to the calling party 12 after the calling party 12 has provided an appropriate identity and telephone number in response to the first and second prompts for such information. For example, after the calling party 12 has responded to the first prompt for the name of the calling party 12, a first confirmation statement may be played to the calling party 12 to echo or confirm the name provided by the calling party 12.

The second player 50 stores, either digitally or on tape, and plays to the calling party 12 at least the second announcement. In one embodiment, the second player 50 is a conventional system implemented in the peripheral 18. Alternatively, the second player 50 is implemented in a voice messaging peripheral (e.g., Nortel's NAV platform or Octel's Sierra). In this regard, the second player 50 can be implemented on a voice card (e.g., Dialogic Board) for use in the peripheral 18, as is known by those skilled in the art. In another embodiment (not shown), the second player is implemented in the central office switch. In still another embodiment, the second player is implemented in hardware, software and firmware. The first and second players 30, 50 may function to play the first and second announcement, respectively, or, alternatively, the first and second players 30, 50 comprise a single system for playing both the first and the second announcements.

For purposes of interfacing with the calling party 12 in obtaining relevant information to facilitate a call back from the called party 14, in one embodiment, the method of the present invention includes the steps of receiving and processing such information from the calling party, the information being in the form of voice and/or DTMF inputs. As such, during the period for collecting and processing information from the calling party 12, the second player 50 interfaces and cooperates with a first receiver 60, which is capable of collecting, processing and storing inputs provided by the calling party 12 in response to the second announcement played by the player 50. More specifically, the first receiver 60 processes such inputs by recognizing voice inputs and/or decoding DTMF inputs from the calling party 12, the inputs being indicative of an identity and termination telephone number associated with the calling party 12 and digitally stores such information. Such voice recognition and DTMF decoding techniques and systems are conventional and may be implemented in the peripheral 18, illustrated in FIGS. 2A–2B. Alternatively, the receiver is implemented in the switch.

Once information from the calling party 12 has been collected and processed by the receiver 60, the method of the present invention, shown in FIGS. 4A–4B, may include the step of scheduling an appropriate time(s) for attempting to deliver the information provided by the calling party to the called party. In one embodiment, shown in FIGS. 2A–2B, a scheduler 70 may be activated to schedule at least a first call to the called party 14 to attempt to deliver the information provided by the calling party 12. In this regard, the scheduler 70 is capable of scheduling placement of at least a first telephone call to the called party 14 at preselected intervals during and/or for predetermined periods. In one embodiment, the scheduler 70 assigns a schedule for placing calls to the called party and instructs the caller 80, which will be described in more detail hereinbelow, to place a call to the called party 14 at predetermined intervals (e.g., every 30 minutes, every 60 minutes) and between certain hours of the day (e.g., between the hours of 7:00 a.m. and 10:00 p.m.), until a call is completed to the called party 14 or a predetermined/scheduled period of time has elapsed (e.g., 24 hours). This is especially useful in instances where a first call is placed but not completed to the called party (e.g., the detector 20 notes a busy signal or no-answer condition for the first call to the called party 14). In one embodiment, the scheduler 70 is implemented in the software of the peripheral 18 by conventional coding techniques. Alternatively, the scheduler 70 is implemented in the switch. In an alternative embodiment, in instances where a busy signal was detected, for purposes of placing a telephone call to the called party when the telephone line is no longer busy, the method of the present invention includes the step of monitoring the status or condition of telephone line of the called party for an on-hook condition. Such monitoring may be accomplished by commercially available technology and implemented in an AIN capable switch.

For purposes of attempting to deliver the information provided by the calling party to the called party, the method of the present invention includes the step of initiating placement of or placing a telephone call to the called party 14 to attempt to deliver the information provided by the calling party 12. This may be accomplished via a caller 80, which is interconnected to the scheduler 70 and/or the receiver 60. More specifically, in order to place a telephone call to the called party 14 via the termination telephone number of the called party 14, which is stored within the peripheral 18 (e.g., receiver 60), along with the information provided by the calling party 12, the caller 80 sends an instruction to the switch 16 to outdial the termination telephone number of the called party 14. In this regard, the caller 80 is capable of placing or initiating a telephone call to the called party 14 via the switch 16. In one embodiment, the caller 80 is a conventional system implemented in software of the peripheral 18. Alternatively, the caller is implemented in the switch.

As shown in FIGS. 4A–4B, where at least a first call is placed to the called party to attempt to deliver the information provided by the calling party, in one embodiment, the method of the present invention includes the step of detecting whether the call is completed to the called party or a busy signal or a no-answer condition is noted. In one embodiment of the system, illustrated in FIGS. 2A–2B, for purposes of determining whether at least the first call initiated by the caller 80 to the called party 14 is completed to the called party 14, the first call is routed through the detector 20 in the switch 16. In this regard, in instances where the called party's 14 line is busy, or there is no answer, the detector 20 will note such an exception condition. In such instances, the caller 70 will initiate at least a second call to the called party 14 at a predetermined time to attempt to deliver the information.

Queuing the information provided by the calling party 12 may be performed in instances where a prior calling party's information has not yet been delivered to the called party 14. In one embodiment, illustrated in FIGS. 2A–2B, a queuer 90 is initiated to queue or sequence the specific information from the calling party 12 for delivery to the called party 14. In this regard, the queuer 90 time stamps information from calling parties to queue each completed segment of information from respective calling parties in the order in which it was received from calling parties. For example, prior to the calling party 12 placing the incoming call to the called party 14, a calling party 12i (not shown) could have placed an incoming call to the called party 14 and, upon encountering a busy signal or no-answer condition, provided call back messaging information to the called party 14 via the system 10. In such an instance, where the information provided by the previous calling party 12i has not been delivered to the called party 14 (e.g., due to scheduling, busy signal, no-answer etc), the queuer 90, upon receiving notification of a busy signal or no-answer condition via the detector 20, would bundle the information provided by the calling party 12 behind the information provided by a previous calling party 12i, whose information has yet to be delivered to the called party 14. In one embodiment, the queuer 90 is a conventional technique which is implemented in the peripheral 18. In an alternative embodiment, the queuer is implemented in the switch.

In instances where the caller's 80 telephone call to the called party 14 is completed, as noted by the detector 20, the method of the present invention includes the step of playing at least a first message to the called party, the first messaging containing the name and telephone number of the calling party. In one embodiment, the second player 50 interfaces with the receiver 60 to play at least the first message to the called party 14. In this regard, the second player 50 is capable of playing the second announcement to solicit information from the calling party 12 and capable of playing a first message to the called party 14, the first message containing the information provided by the calling party 12. In one embodiment, the second player 50 plays an actual recording of the voice of the calling party 12 and a stored recording (e.g., on tape or digitized) of the previously voice recognized or decoded termination telephone number of the calling party 12, as provided by the calling party 12 via the receiver 60 in response to the second announcement. The second player 50 may thus, in one embodiment, interface with the receiver 60, which stores the information, to play the taped recording of the voice inputs from the calling party 12 (e.g., the name of the calling party 12). The second player 50 may be implemented in the peripheral 18 substantially as described hereinabove.

Alternatively, a third player (not shown) capable of playing at least a first message to the called party 14 may be used to play the first message to the called party, wherein the first message includes at least the information provided by the calling party 12 via the receiver 60. In this regard, once the receiver 60 has collected and processed the information from the calling party 12, the information may be sent to the third player for delivery to the called party 14.

Figure 3A:
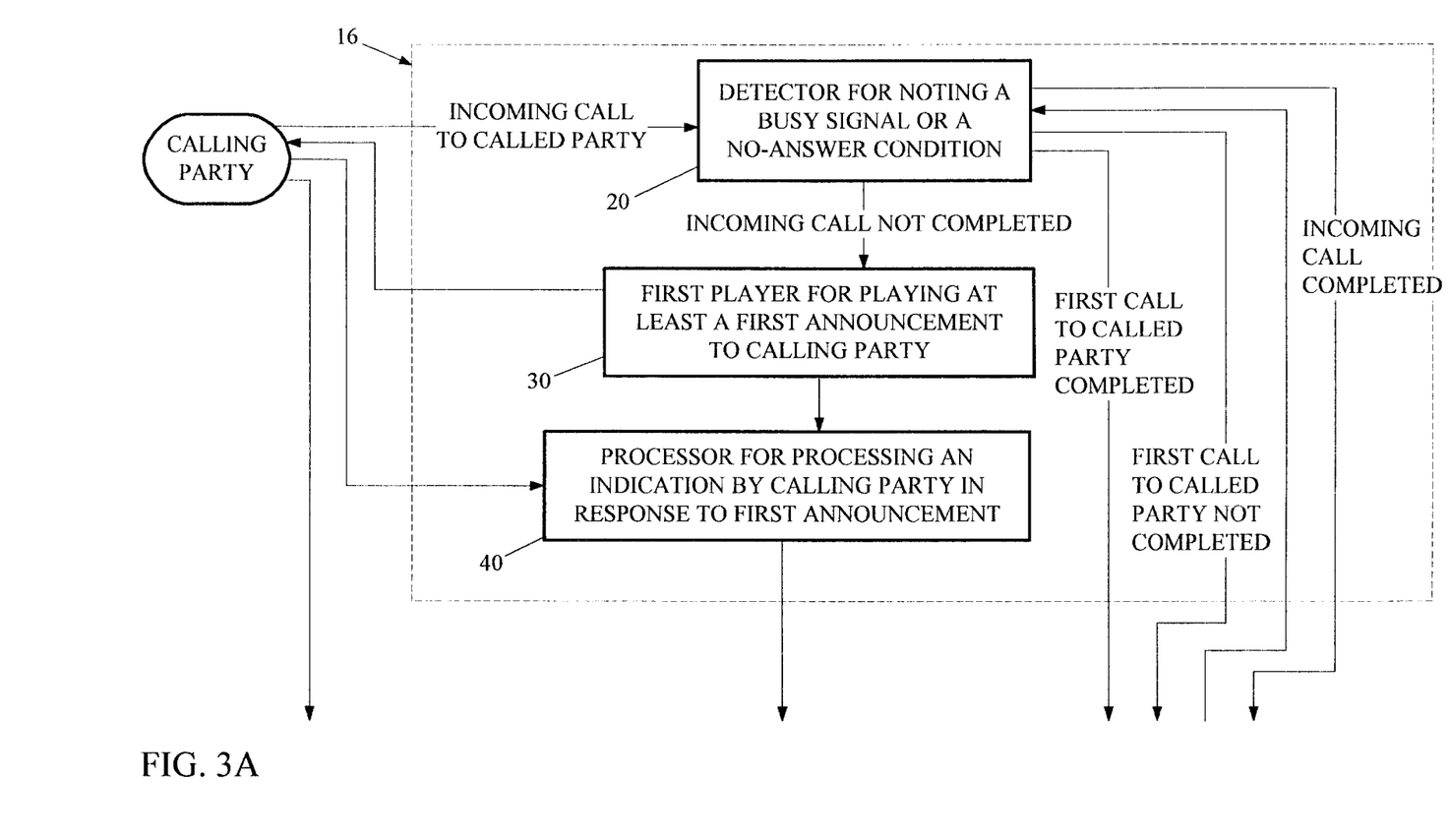
FIGS. 3A–3B present a diagrammatic illustration showing yet another embodiment of the call back messaging system according to the present invention.
Figure 3B:
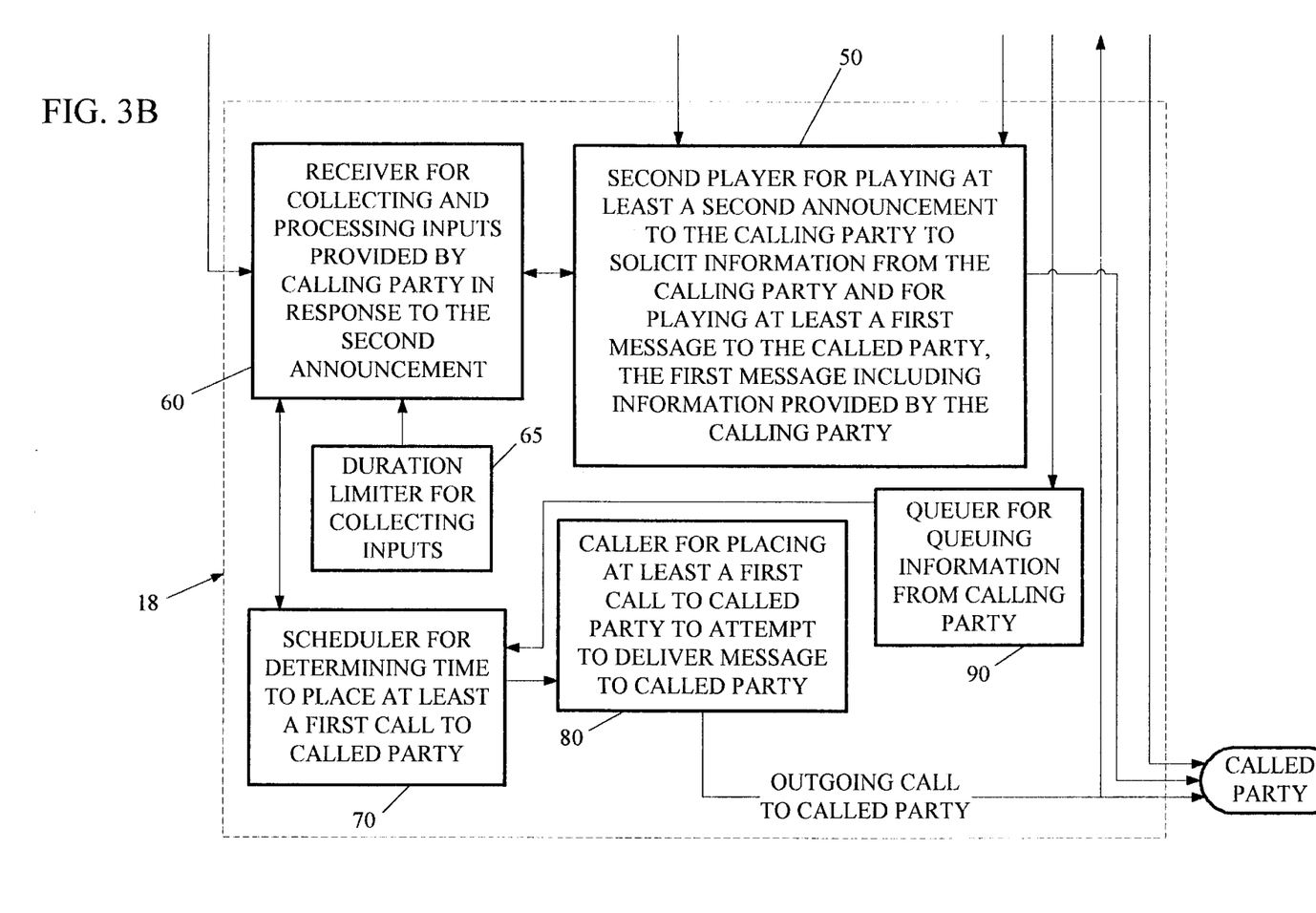
Figure 5A:
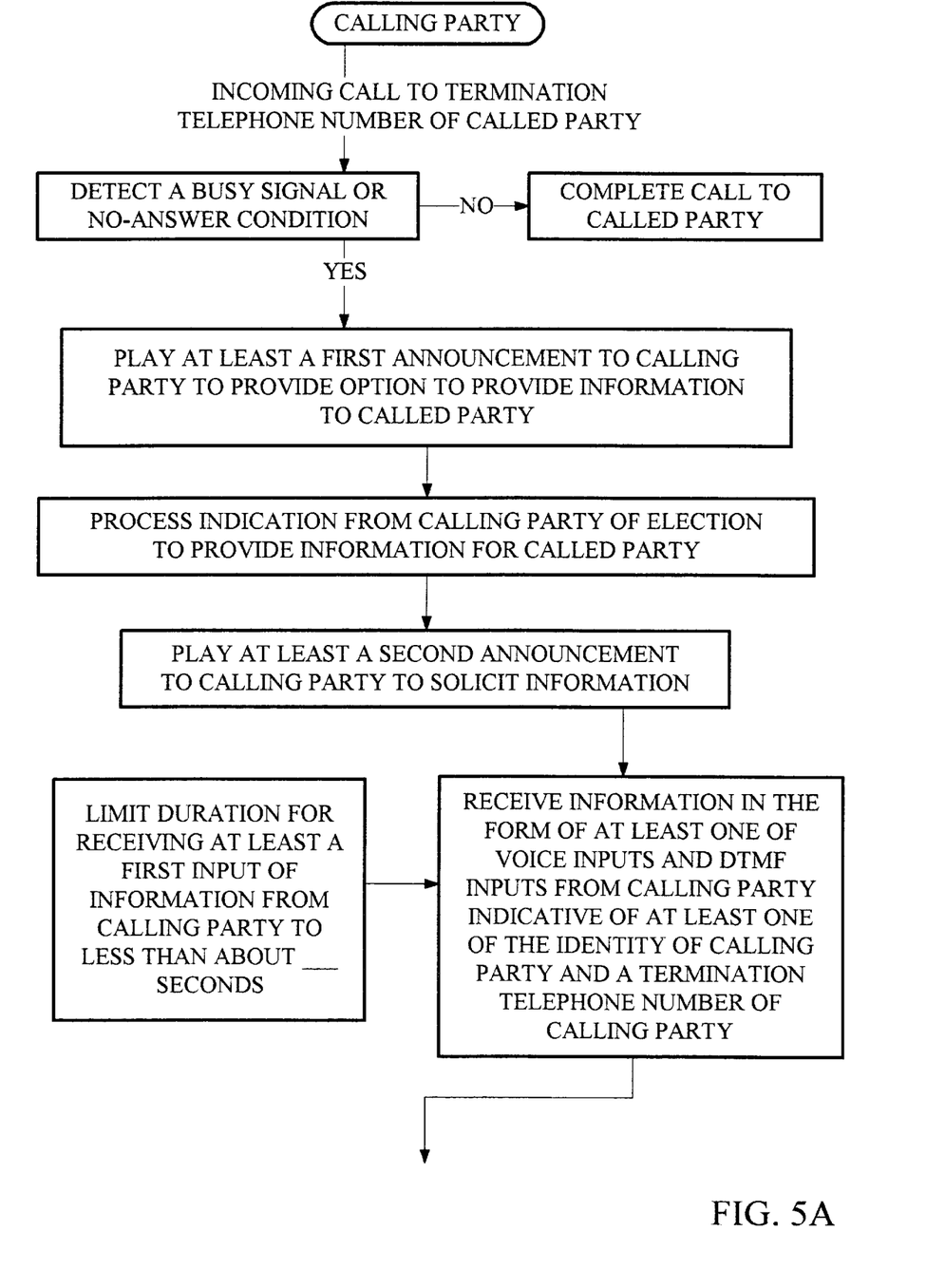
FIGS. 5A–5B present a flow chart of another embodiment of the call back messaging process according to the present invention.
Figure 5B:
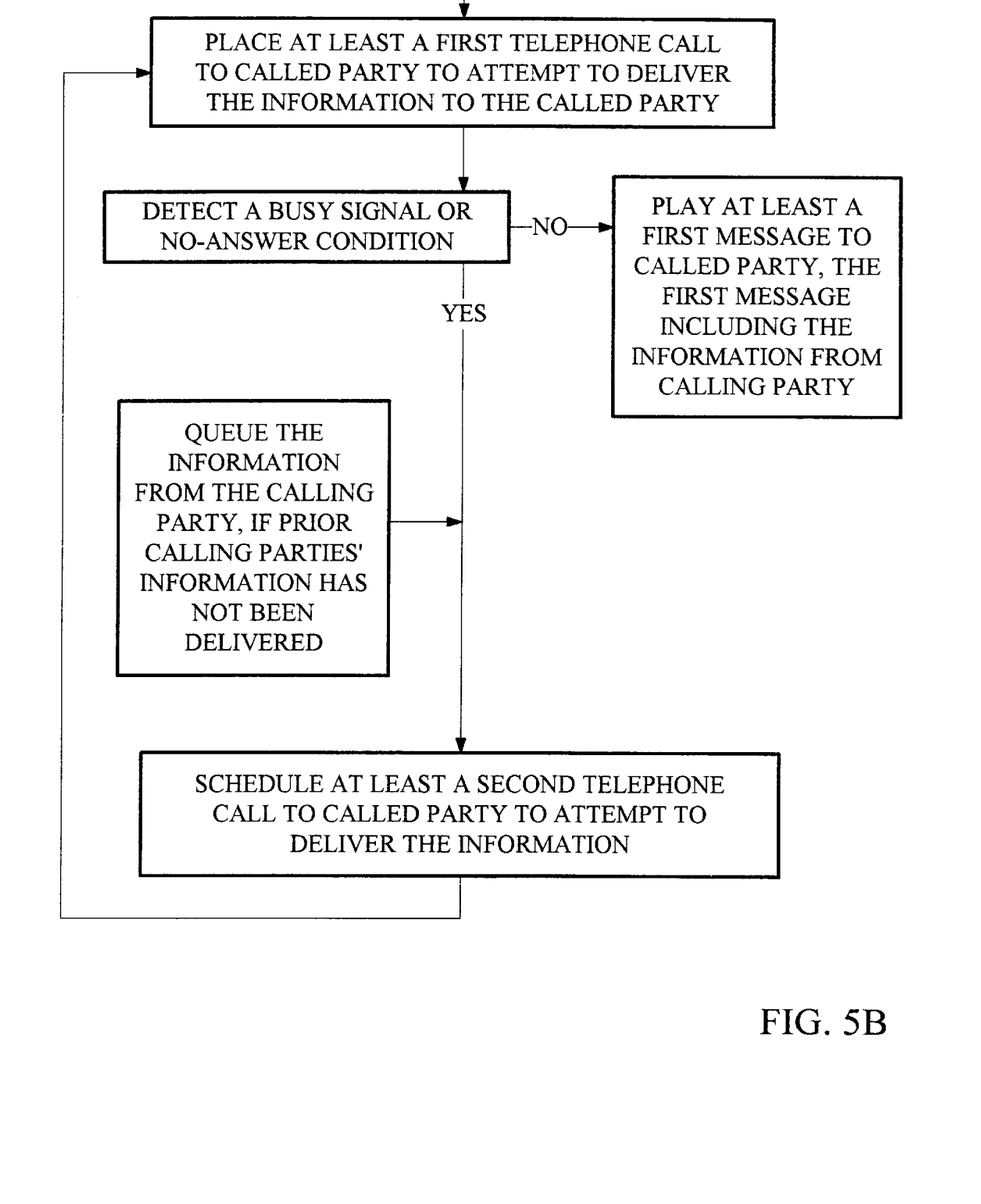

In another embodiment of the present invention, shown in FIGS. 5A–5B, the method further includes the step of limiting the duration of time for receiving inputs from the calling party, wherein the inputs are in response to the second announcement. In this regard, at least a first duration of time for receiving information may be defined. As illustrated in FIGS. 3A–3B, in another embodiment of the invention, the system 10 may also include a limiter 65 for defining the duration of time for collecting inputs from the calling party 12. More specifically, in order to reduce the likelihood that information other than the name and termination telephone number of the calling party is provided by the calling party, the length of the inputs received from the calling party 12 and processed by the system 10, and specifically, the receiver 60, is limited to a specific window of time. In this regard, the limiter 65 instructs the receiver 60 to collect information from the calling party 12 for a specific period of time. For purposes of facilitating a call back to the calling party 12, relevant information needed by the called party 14 includes the name and termination telephone number of the calling party 12, the collection of which from the calling party 12 does not require more than one minute, much less tens of seconds. In one embodiment, the limiter 65 defines first and/or second durations of time for collecting inputs in response to the first and second prompts from the second player 50. In this embodiment, the limiter 65 defines a first duration for collecting a first input (e.g., voice input indicative of identity of calling party 12) from the calling party 12. The first duration is less than or equal to about 6 and, in a preferred embodiment, less than or equal to about 3 seconds. The limiter 65 also defines second duration for collecting a second input (e.g., voice inputs indicative of termination telephone number of calling party 12) from the calling party 12. In one embodiment, the second duration is less than about 6 seconds. In another embodiment, the second duration is defined by the time by which seven or more (e.g., in instances where "1+" long distance telephone numbers are provided) DTMF digits have been collected by a DTMF receiver or 7 or more voice inputs have been collected and recognized by a voice recognizer. The limiter 65 is a conventional technique which may be implemented in the peripheral 18 or, alternatively, the switch.

Once information from the calling party has been delivered (e.g., telephone call placed to called party and message containing information played to called party), the method of the present invention contemplates further facilitating communication between the parties. In this regard, in another embodiment of the invention (not shown), the method of the present invention further includes the step of providing an option to the called party to be connected to the calling party via the termination telephone number of the calling party. The step of providing such an option to the called party includes the step of playing a prompt to the called party, the prompt including an option to be automatically connected to the calling party via the termination telephone number of the calling party. Such a prompt may be included in the first message containing the information from the calling party, or alternatively, in a second message played to the called party. In this regard, for purposes of processing an election by the called party to be connected to the calling party, the method of the present invention also includes the steps of receiving an input (e.g., voice or DTMF input) from the called party in response to the prompt, the input being indicative of an election by the called party to be automatically connected to the calling party, and placing a telephone call from the called party to the calling party via the termination telephone number of the calling party. In one embodiment (not shown), the system 10 of the present invention may be linked with a switch having last call return capability, which is commercially available from various suppliers of switches. In this regard, the peripheral 18 of the present invention may instruct the switch 16 to offer the commercially available last call return service to the called party to provide the called party an opportunity to be connected to the calling party(ies), especially since such switches have the capability to recall the termination telephone numbers of the previous 10 calling parties.

In another embodiment (not shown), a prompt provides the calling and/or called parties an option to deny the service for leaving information for called parties and receiving messages from calling parties, respectively, according to the method and system of the present invention. In this regard, the prompt to the calling and called parties may include an announcement, such as "[t]o remove this service from this line for all future calls, please press or say 4 at this time." In one embodiment, the first player contains such a prompt and the processor is capable of receiving an input indicative to the calling party's election to remove this service and storing such data for future use. Similarly, in another embodiment, the second player contains such a prompt and the receiver and/or processor described hereinabove is capable of receiving and storing an input from the called party to remove this service. In this regard, upon receipt of an incoming call, for purposes of offering this service, the processor may compare the termination telephone numbers of the calling party and called party with data in a look-up table or database within the processor in order to determine whether one of the calling party and the called party has requested discontinuance of the service. If one of the calling party and called parties has made such a request, an announcement for the above-described service would not be played to the party. In such cases, the switch may, in some instances, simply provide an indication that the line is busy (e.g., busy signal) or that there is no one available to answer the telephone (e.g., ringing telephone).

The foregoing discussion of the invention has been presented for purposes of illustration and description. Further, the description is not intended to limit the invention to the form disclosed herein. Consequently, variation and modification commensurate with the above teachings, within the skill and knowledge of the relevant art, are within the scope of the present invention. The embodiment described herein and above is further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extend permitted by the prior art.

What is claimed is:

1. A method for facilitating communication between a calling party and a called party via a termination telephone number associated with the called party, said method comprising the steps of:

detecting an exception associated with an incoming call from the calling party to the termination telephone number of the called party;

playing at least a first announcement to the calling party to solicit at least one of an indication of an election to provide information to the called party and information for delivery to the called party;

defining at least a first period of tine for receiving the information from the calling party as a first input, the first input corresponding to at least one of an identity of the calling party and a termination telephone number associated with the calling party, wherein said first period of time is limited to less than or equal to six seconds;

processing, in response to at least the first announcement, at least one of the indication and the information collected from the calling party during the first period of time, the indication and the information being in a form of at least one of voice inputs and dual tone multiple frequency inputs, wherein the information is indicative of at least one of an identity of the calling party and a termination telephone number associated with the calling party;

placing at least a first call to the called party via the termination telephone number of the called party to attempt to deliver the information provided by the calling party;

playing, after completion of placing at least the first call, at least a first message to the called party, the first message including at least the information provided by the calling party and an option to be connected to the calling party;

processing an election by the called party, the election indicative of a desire to be connected to the calling party, wherein said processing the election step is capable of processing both a voice input and a dual tone multiple frequency input from the called party, wherein the election comprises one of the voice input and the dual tone multiple frequency input from the called party; and placing a first return call to the calling party associated with the incoming call via a termination telephone number of the calling party corresponding to the information provided by the calling party.

2. A method, as claimed in claim 1, wherein said step of processing at least one of the indication and the information collected from the calling party comprises at least one of the following steps:

recording the voice inputs from the calling party, wherein the voice inputs are indicative of the identity of the calling party;

decoding the dual tone multiple frequency inputs from the calling party, wherein the dual tone multiple frequency inputs are indicative of the termination telephone number of the calling party; and voice recognizing the voice inputs from the calling party, wherein the voice inputs are indicative of the termination telephone number of the calling party.

3. A method, as claimed in claim 1, wherein said step of detecting the exception comprises the step of detecting one of a busy condition and a no answer condition associated with the termination telephone number of the called party.

4. A method for facilitating communication between a calling party and a called party via a termination telephone number associated with a called party, said method comprising the steps of:

processing a first exception associated with an incoming call from the calling party to the termination telephone number of the called party;

playing at least a first announcement to provide an opportunity to the calling party to provide information to the called party;

defining at least a first and a second period of time for receiving the information from the calling party as a first and a second input, the first input corresponding to at least one of an identity of the calling party and a termination telephone number associated with the calling party;

collecting, in response to at least the first announcement, at least the first and second inputs from the calling party within the first and second periods of time, wherein the first period of time for collecting the first input from the calling party is limited to less than or equal to six seconds and the second period of time for collecting the second input is less than or equal to six seconds, wherein the first input is indicative of one of the identity and termination telephone number of the calling party and the second input is indicative of the other of the identity and termination telephone number of the calling party;

delivering the information provided by the calling party to the called party;

playing at least a second announcement to provide an opportunity to the called party to be connected to the calling party;

processing at least a first called party input from the called party indicative of a desire to be connected to the calling party associated with the incoming call, wherein said step of processing at least the first called party input is capable of processing both a called party voice input and a called party dual tone multiple frequency input, wherein the first called party input from the called party comprises at least one of the called party voice input and the called party dual tone multiple frequency input; and placing a call from the called party to the calling party associated with the incoming call via the termination telephone number of the calling party associated with the incoming call.

5. A method, as claimed in claim 4, wherein said step of processing the first exception comprises the step of detecting at least one of a busy condition and a no answer condition at the termination telephone number of the called party.

6. A method, as claimed in claim 4, further comprising the step of:

playing at least a first prompt to the calling party to provide the calling party an option to provide the information to the called party, wherein the first prompt indicates to the calling party one of a busy condition and a no answer condition for the termination telephone number of the called party.

7. A method, as claimed in claim 6, further comprising, after said step of playing the first prompt, the step of:

processing a first indication from the calling party in response to the first prompt to the calling party, the first indication being indicative of a decision by the calling party to provide the information to the called party.

8. A method, as claimed in claim 7, wherein the first indication is one of a calling party input and a calling party dual tone multiple frequency input.

9. A method, as claimed in claim 4, wherein the second input includes a plurality of calling party dual tone multiple frequency inputs indicative of the termination telephone number of the calling party associated with the incoming call, wherein said step of collecting comprises the step of collecting at least seven calling party dual tone multiple frequency inputs from the calling party.

10. A method, as claimed in claim 4, wherein at least the first input includes calling party voice inputs from the calling party, wherein said step of collecting the first input comprises performing one of the steps of:

recording calling party voice inputs provided by the calling party associated with the incoming call for replay to the called party, the calling party voice inputs being indicative of the identity of the calling party; and recognizing the calling party voice inputs provided by the calling party, the calling party voice inputs being indicative of the termination telephone number of the calling party.

11. A method, as claimed in claim 4, wherein at least the first input includes calling party dual tone multiple frequency inputs from the calling party associated with the incoming call, wherein said collecting step comprises the step of decoding the calling party dual tone multiple frequency inputs provided by the calling party to determine one of the identity of the calling party associated with the incoming call and the termination telephone number of the calling party associated with the incoming call.

12. A method, as claimed in claim 4, wherein said step of delivering the information to the called party comprises the step of:

detecting one of completion and an exception associated with a first outgoing call to the called party to attempt to deliver the information provided by the calling party associated with the incoming call.

13. A method, as claimed in claim 12, wherein a first exception associated with the termination telephone number of the called party is detected on the first outgoing call to the called party, said method further comprising the step of:

placing at least a second outgoing call to the called party to attempt to deliver the information provided by the calling party, wherein the second outgoing call is placed via the termination telephone number of the called party.

14. A method, as claimed in claim 13, wherein said step of placing at least the second outgoing call to the called party is conducted a time interval after said step of placing the first outgoing call to the called party.

15. A method, as claimed in claim 4, further comprising the step of:

scheduling the information provided by the calling party for delivery to the called party according to a first schedule, wherein said step of delivering the information to the called party comprises the step of initiating at least a first outgoing call to the called party in accordance with the first schedule.

16. A system for facilitating communication between a calling party and the called party via a termination telephone number associated with the called party, comprising:

detecting means for noting an exception associated with an incoming call by the calling party to the called party, said exception being one of a busy condition and a no-answer condition;

first playing means, interconnected to said detecting means, for playing at least a first announcement to provide an option to the calling party to provide information for delivery to the called party;

processing means, interconnected to said first playing means, for collecting an indication from the calling party in response to at least said first announcement;

second playing means, interconnected to said processing means, for playing at least a second announcement to solicit information for delivery to the called party;

limiting means for defining at least a first duration for collecting at least a first calling party input from the calling party;

first receiving means, interconnected to said second playing means and said limiting means, for collecting at least said first calling party input from the calling party only within said first duration, said first duration being less than or equal to six seconds, wherein said first calling party input is indicative of at least one of an identity and a termination telephone number of the calling party;

calling means, interconnected to said first receiving means, for placing at least a first call to the called party via the termination telephone number of the called party to deliver the information provided by the calling party associated with the incoming call via the second playing means, wherein said second playing means plays a second message to provide the called party an option to communicate with the calling party via at least one of the identity and the termination telephone number provided by the calling party;

second receiving means, interconnected to said second playing means, for collecting at least a first called party input from the called party, wherein said second receiving means is adapted for collecting both a called party voice input and a called party dual tone multiple frequency input from the called party;

connecting means, interconnected with said second playing means, for placing a call from the called party to the calling party via at least one of the identity and the termination telephone number of the calling party.

17. A system, as claimed in claim 16, wherein said first calling party input is in the form of one of calling party voice inputs and calling party dual tone multiple frequency inputs, wherein said first receiving means includes at least one of a recording means and a voice recognition means capable of collecting said calling party voice inputs and dual tone multiple frequency decoder means capable of decoding said calling party dual tone multiple frequency inputs from the calling party associated with the incoming call.

18. A system, as claimed in claim 16, further comprising:

means for queuing information provided by a plurality of calling parties for delivery to the called party.

19. A system, as claimed in claim 16, further comprising:

means for scheduling delivery to the called party of the information provided by the calling party in accordance with a first schedule.

* * * * *